United States Patent
Gundavelli et al.

(10) Patent No.: US 11,962,488 B2
(45) Date of Patent: Apr. 16, 2024

(54) SUPPORTING MULTIPATH TRANSMISSION CONTROL PROTOCOL SUBFLOWS USING MULTIPATH LINKS

(71) Applicant: Cisco Technology, Inc., San Jose, CA (US)

(72) Inventors: Srinath Gundavelli, San Jose, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/856,524

(22) Filed: Jul. 1, 2022

(65) Prior Publication Data

US 2024/0007393 A1    Jan. 4, 2024

(51) Int. Cl.
*G06F 13/00* (2006.01)
*H04L 45/00* (2022.01)
*H04L 45/24* (2022.01)
*H04L 45/44* (2022.01)

(52) U.S. Cl.
CPC .............. *H04L 45/24* (2013.01); *H04L 45/38* (2013.01); *H04L 45/44* (2013.01)

(58) Field of Classification Search
CPC .......... H04L 45/24; H04L 45/38; H04L 45/44
USPC ........................................ 709/238, 227–229
See application file for complete search history.

(56) References Cited

U.S. PATENT DOCUMENTS

| | | | |
|---|---|---|---|
| 11,223,565 B2 * | 1/2022 | Buddhikot | H04L 47/125 |
| 11,570,239 B2 * | 1/2023 | Desmouceaux | H04L 69/164 |
| 11,647,083 B2 * | 5/2023 | Khanal | H04L 67/1027 370/254 |
| 2017/0078206 A1 | 3/2017 | Huang et al. | |
| 2017/0134261 A1 | 5/2017 | Seo et al. | |
| 2019/0288935 A1 | 9/2019 | Sen et al. | |
| 2020/0322841 A1 | 10/2020 | Hyun et al. | |
| 2020/0389403 A1 * | 12/2020 | Buddhikot | H04L 47/215 |
| 2021/0329069 A1 * | 10/2021 | Desmouceaux | H04L 67/146 |
| 2022/0418017 A1 * | 12/2022 | Alam | H04W 76/15 |
| 2023/0027642 A1 * | 1/2023 | Khanal | H04L 67/1027 |

OTHER PUBLICATIONS

Durga Prasad Sharma, Sumit Gautam, Commodore H.P. Singh, "LTE—Wi-Fi Aggregation Solutions and Congestion Control Management in MPTCP", 4th International Conference on Cyber Security and Privacy in Communication Networks (ICCS) 2018, Oct. 2018, 7 pages.

* cited by examiner

*Primary Examiner* — Kenneth R Coulter

(74) *Attorney, Agent, or Firm* — Merchant & Gould P.C.

(57) ABSTRACT

Supporting Multipath Transmission Control Protocol (MPTCP) subflows using multipath links, and more specifically supporting MPTCP subflows using Wi-Fi Multi-Link Operation (MLO) or cellular multi-link support may be provided. A multipath link may be established between an Access Point (AP) and a station (STA). The STA may mark the multipath link as Multipath Transmission Control Protocol (MPTCP) capable. Next, a request for an addition of a MPTCP subflow may be received. In response to receiving the request, the MPTCP subflow may be bound to the multipath link, and data from the MPTCP subflow may be sent over the multipath link.

20 Claims, 4 Drawing Sheets

SUPPORTING MULTIPATH TRANSMISSION CONTROL PROTOCOL SUBFLOWS USING MULTIPATH LINKS

TECHNICAL FIELD

The present disclosure relates generally to supporting Multipath Transmission Control Protocol (MPTCP) subflows using multipath links, and more specifically supporting MPTCP subflows using Wi-Fi Multi-Link Operation (MLO) or cellular multi-link support.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
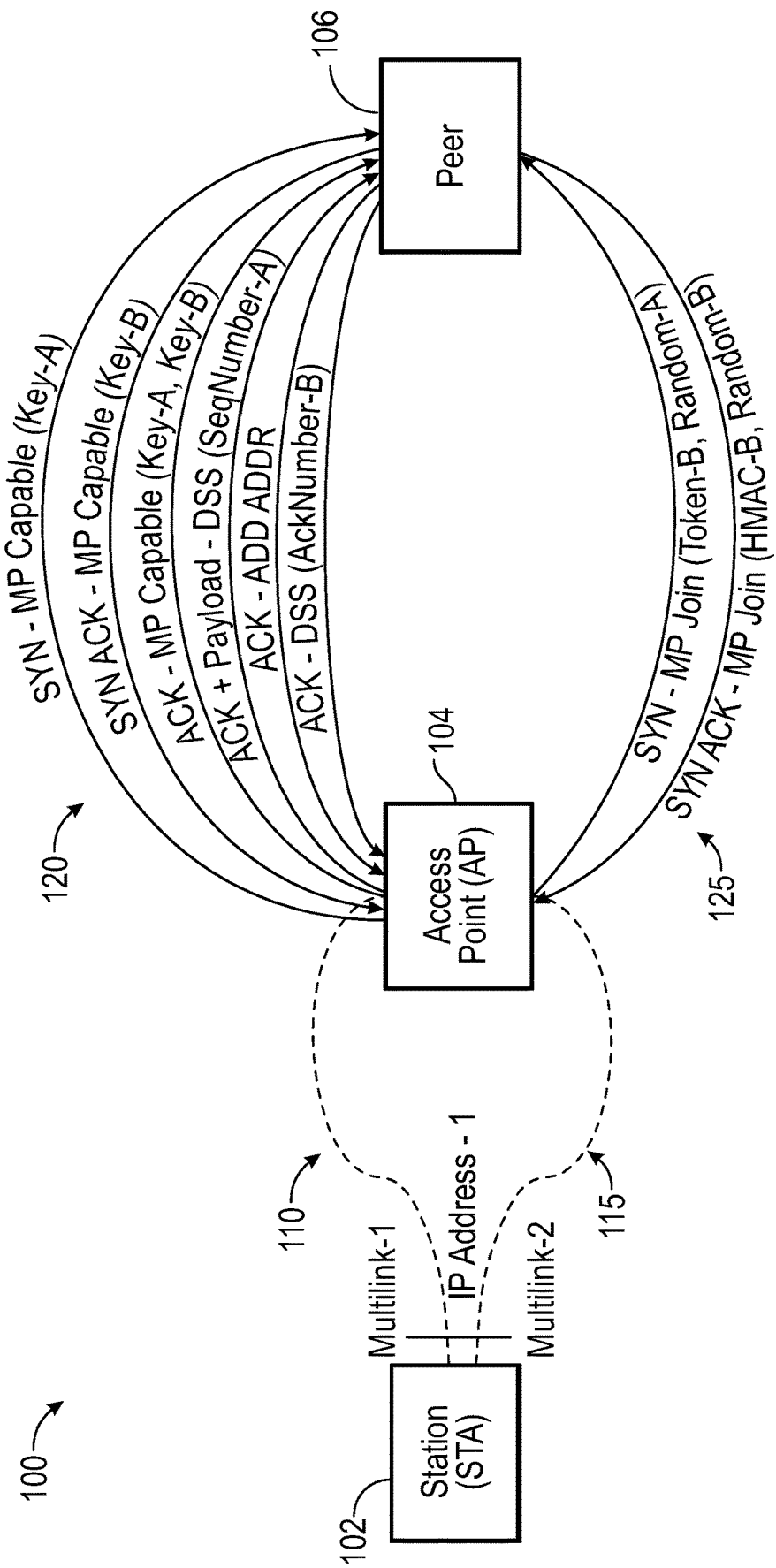
FIG. 1 is a block diagram of an operating environment for supporting Multipath Transmission Control Protocol using Wi-Fi Multi-Link Operation.

Supporting Multipath Transmission Control Protocol (MPTCP) subflows using multipath links, and more specifically supporting MPTCP subflows using Wi-Fi Multi-Link Operation (MLO) or cellular multi-link support may be provided. A multipath link may be established between an Access Point (AP) and a station (STA). The STA may mark the multipath link as Multipath Transmission Control Protocol (MPTCP) capable. Next, a request for an addition of a MPTCP subflow may be received. In response to receiving the request, the MPTCP subflow may be bound to the multipath link, and data from the MPTCP subflow may be sent over the multipath link.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multipath TCP (MPTCP) may enable a TPC connection to use multiple paths for a communication between MPTCP-capable peers. Each IP interface of a device may present a distinct transport end point and a path to the application peer. A Station (STA) with multiple interfaces, such as a Fifth Generation (5G) interface and a Wi-Fi interface, may initiate MPTCP with a subflow bound to a single interface. However, binding subflows to distinct interfaces may produce limitations when a single interface bundles multiple layer-2 multipath links.

A Wi-Fi 7 capable STA leveraging Multi-Link Operation (MLO) may establish multipath links with the same or different Access Points (APs). An STA may establish more than one link with an AP Multi-Link Device (AP MLD), enabling a multi-link AP logical entity and a multi-link non-AP logical entity to use multiple paths (e.g., a 5 GHz path and a 6 GHz path). However, the bundled links that are part of the interface may not be visible to the application. The host stack therefore may not perform MPTCP subflow additions on a path basis. For example, the host may view the Wi-Fi 7 interface as a single IP interface, and the host may not activate the MPTCP extensions for a subflow addition for each of the Wi-Fi 7 paths.

In the absence of such visibility for the application layer, the traffic on a Wi-Fi 7 interface over a single TCP connection may be bound to only one of the available paths. The traffic may even be distributed over different multipaths of an IP interface, which may result in poor application performance compared to initiating unique MPTCP subflows to specific paths.

While the systems and processes performed herein may be primarily referred to as being performed using devices connected to a Wi-Fi 7 network, the systems and processes may also be performed for cellular networks such as a 5G network. For example, an AP that supports Long Term Evolution Wireless Local Area Network (LTE-WLAN) Aggregation (LWA) and/or License Assisted Access (LAA) based multi-link may support MPTCP subflows. An STA may establish MPTCP subflows with APs that support Wi-Fi 7 and with APs that support cellular networks with multi-link support simultaneously.

FIG. 1 is a block diagram of an operating environment 100 for supporting MPTCP using Wi-Fi MLO. The operating environment 100 includes a Station (STA) 102, an Access Point (AP) 104, and a peer 106. In other examples, there may be more STAs 102, APs 104, and/or peers 106. For example, there may be an AP that provides access to a Wi-Fi 7 network and an AP that provides access to a cellular network that is multi-link capable.

The STA 102 may be any device that connects to the AP 104, such as a computer, a mobile device, or the like. The STA 102 may be capable of communicating via the Institute of Electrical And Electronics Engineers (IEEE) 802.11 (Wi-Fi) protocol and be MPTCP capable. The AP 104 may create a wireless local area network to allow the STA 102 to connect to the AP 104 and access a network. The AP 104 may be IEEE 802.11be (Wi-Fi 7) capable, and the AP 104 may be capable of using MLO. The peer 106 may be another device on the network and be MPTCP capable. For example, the device may be another computer or mobile device, a server, or another device that communicates with the STA 102 via the AP 104.

The STA 102 may first link to the AP 104 via a negotiation that may include a probe request, a probe response, an authentication request, an authentication response, an association request, and/or an association response. During the negotiation between the STA 102 and the AP 104, the AP 104 may indicate to the STA 102 that the AP 104 is Multipath capable, such as the AP 104 supporting MLO when the network is a Wi-Fi 7 network or the AP 104 supporting LWA/LAA based multi-link when the network is a cellular (e.g., 5G) network for example. The STA 102 may also identify that the AP 104 supports MLO by identifying that the AP 104 connects to the Wi-Fi 7 network. The STA 102 may mark AP 104 and/or the link to the AP 104 as Multipath capable by storing an identifier on the host stack that indicates that the connection to link AP 104 is Multipath capable.

Once the STA 102 and AP 104 complete the negotiation and the STA 102 marks the AP 104 and/or the link to the AP 104 as Multipath capable, the STA 102 may communicate with peer 106 via the AP 104. The STA 102 and/or AP 104 may use multipath links as unique MPTCP and/or another Multipath transport protocol subflow paths.

The multipath links may be activated and deactivated on-demand based on application layer triggers for subflow addition and deletion. For example, an application may request a MPTCP subflow addition, and the STA 102 may activate a multipath link for the MPTCP subflow to send data over. In another example, an application may request an MPTCP subflow deletion, and the STA 102 may deactivate the multipath link the MPTCP subflow was using.

The STA 102 may use a single IP address for different transport connections and for binding the connections to the multipath links. The marking indicates that there may be multiple paths for MPTCP subflows even though a single IP address is used. The formulated transport connections may be bound to a specific multipath, resulting in multi-interface visibility for the application and a new forwarding path. The STA 102 may present each multipath link as a distinct IP interface to the upper level stack, including the session layer, the presentation layer, and the application layer.

Multipath link addition and deletion may be performed by the application layer, the socket layer, or elements of the host stack based on application requirements, transport performance, and the like. The STA 102 may request the Wi-Fi 7 link-layer to perform path addition and deletion on an on-demand basis. For example, an MPTCP application of the STA 102 may request the stack to perform MPTCP subflow addition by requesting the stack to send a synchronize (SYN) message containing an MP_JOIN message over one of the Multipaths of the Wi-Fi 7 interface. The application may formulate the transport connection identifiers. For example, the MPTCP application may request the stack to formulate a unique transport identifier, such as by including the IP address and the port, for a connection and bind a subflow to a Multipath that is to be created or to an existing Multipath to which no MPTCP subflow is bound. The MPTCP application may also request the stack to create a new Multipath by invoking path addition procedures of the Wi-Fi 7 link-layer and perform MPTCP subflow addition over the newly created Multipath link.

When the STA 102 sends a request to the network for a network path addition, the request may also notify the AP 104 that the created path is for exclusive use of the subflow associated with the request. The AP 104 may perform downlink path binding by mapping the indicated MPTCP subflow in the request to the downlink path. When the STA 102 requests the stack to send a SYN message containing an MP_JOIN message, the AP 104 may detect the SYN+MP_JOIN message use the header fields of the message for downlink path binding.

FIG. 1 illustrates a Multipath link 110, a Multipath link 115, a path 120, and a path 125. One MPTCP subflow may flow between the STA 102 and the peer 106 via the Multipath link 110 and the path 120. Another MPTCP subflow may flow between the STA 102 and the peer 106 via the Multipath link 115 and the path 125. The STA 102 may have a single IP address, but the STA 102 may mark the Multipath link 110, the Multipath link 115, and/or the AP 104 as MPTCP capable to allow MPTCP subflows to use the Multipath link 110 and the Multipath link 115.

The STA 102 may control or cause the MPTCP subflows to flow through the Multipath link 110 or the Multipath link 115 based on a transport connection identifier associated with each subflow, which may be produced using the IP address of the STA 102, the peer 106 IP address, the port number, and the like. The AP 104 may also cause the MPTCP subflows to flow through path 120 or path 125 based on the transport connection identifier. The STA 102 may maintain a table that stores which subflow(s) should be sent for which multipath link, such as the multipath link 110 and the Multipath link 115. The table may also indicate which path, such as path 120 and path 125, should be used when communicating with the peer 106. The STA 102, the AP 104 and/or the peer 106 may use the table and/or the transport connection identifier to determine the path each subflow should take.

In an example, the STA 102 and AP 104 establish the multipath link 110 before the Multipath link 115. Thus, the STA 102 may mark the AP 104 and/or the Multipath link 110 as MPTCP capable when the Multipath link 110 is established. The STA 102 may use the marking to mark the multipath link 115 as MPTCP capable when the multipath link 115 is established.

Figure 2:
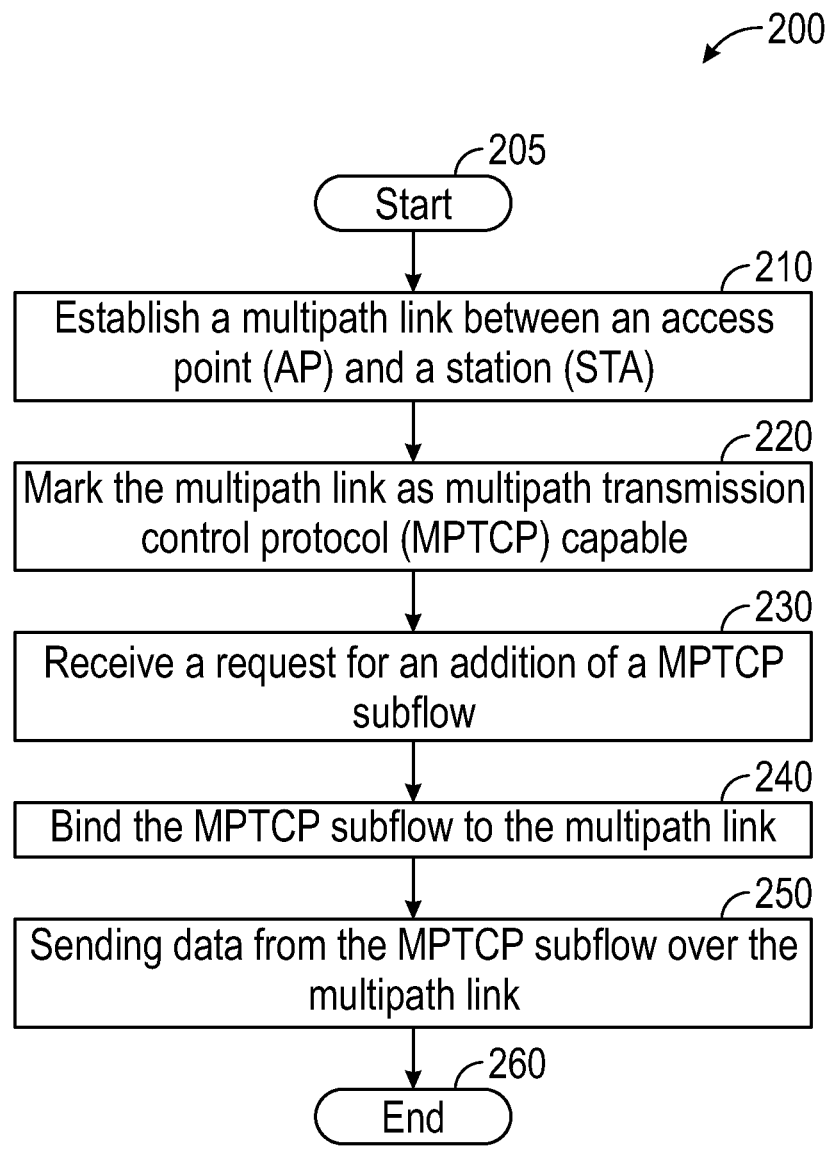
FIG. 2 is a flow chart of a method for supporting Multipath Transmission Control Protocol using Wi-Fi Multi-Link Operation.

FIG. 2 is a flow chart of a method 200 for supporting MPTCP using Wi-Fi MLO. The method begins in starting block 205 and proceeds to operation 210, where a multipath link between an AP and a STA is established. For example, the STA and AP may perform the negotiation steps to establish the Multipath link. Establishing the multipath link may include the STA identifying that the network is MPTCP capable.

In operation 220, the multipath link is marked as MPTCP capable. For example, the STA may mark the multipath link as MPTCP capable. The STA may identify that the multipath link is MPTCP capable in operation 210.

In operation 230, a request for an addition of a MPTCP subflow is received. For example, the STA receives the request for the addition of a MPTCP subflow from an application. The request may include a request for the STA to send a join signal to the AP over the multipath link. The join signal may be a SYN message with a MP_JOIN message. The request may also include a transport connection identifier that identifies the multipath link to be bound to the subflow and the port. Thus, the STA may use the transport connection identifier to determine which multipath link is to be associated with the MPTCP subflow and whether a new multipath link should be created.

In operation 240, a MPTCP subflow is bound to the multipath link. For example, the STA requests the host stack to bind a MPTCP subflow to the multipath link. The MPTCP subflow is then associated with the multipath link and may send data via the multipath link.

In operation 250, data from the MPTCP subflow is sent over the multipath link. For example, the STA causes the data to be sent to the AP via the multipath link. The AP may then send the data to a peer. Method 200 concludes at ending block 260.

Figure 3:
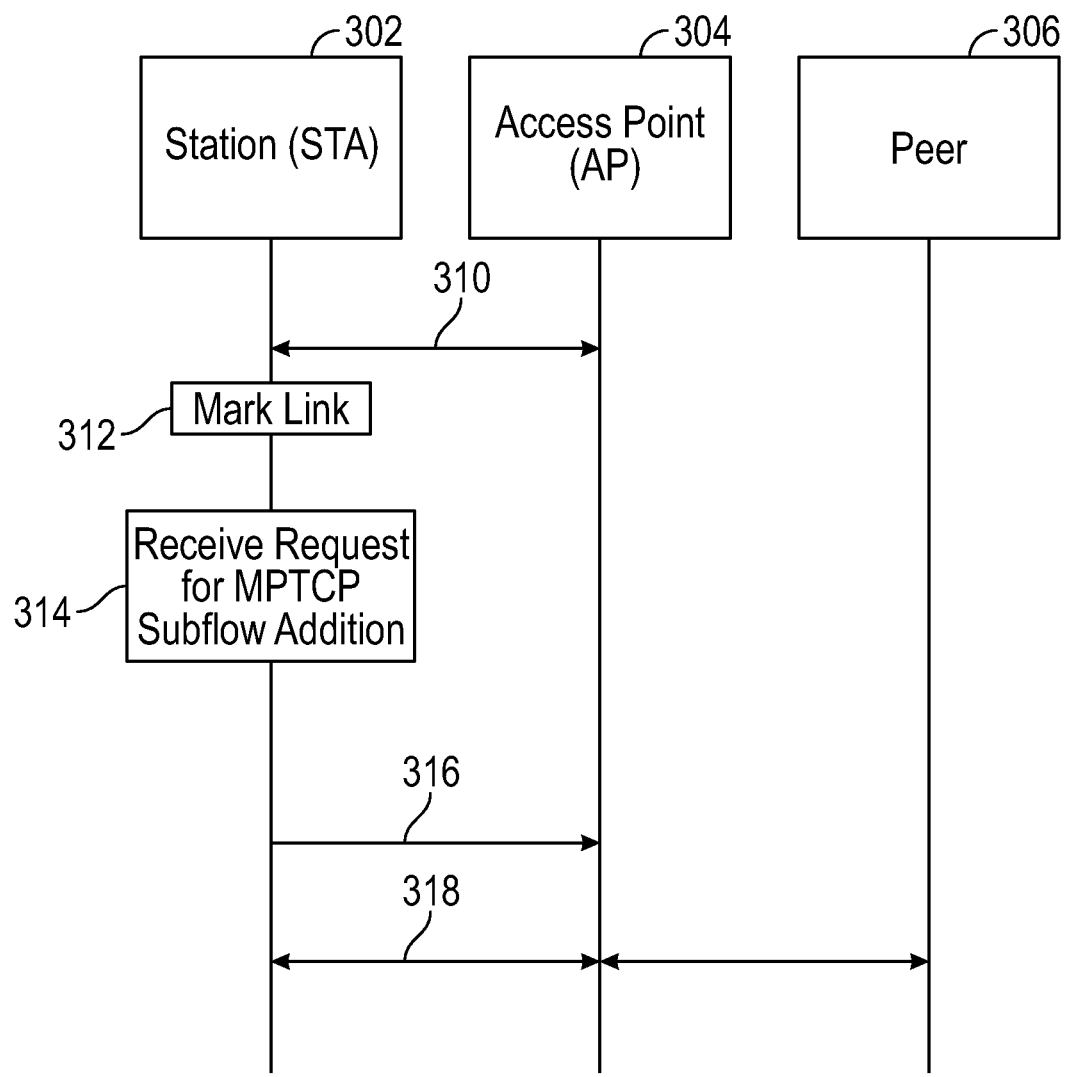
FIG. 3 is a signaling process between a station, an access point, and a peer for Multipath Transmission Control Protocol using Wi-Fi Multi-Link Operation.

FIG. 3 is a signaling process between an STA 302, an AP 304, and a peer 306 for MPTCP using Wi-Fi MLO. Signaling process begins with signals 310, and the STA 302 and AP 304 perform negotiation steps create a Multipath link. The negotiation steps may include the STA 302 identifying that the network is MPTCP capable.

In operation 312, the STA 302 marks the multipath link as MPTCP capable. In operation 314, the STA 302 receives a request for a MPTCP subflow addition, such as from an application for example. The request may include a request to send a join signal to the AP 304 and/or a transport connection identifier. The application of the STA 302 may formulate the transport connection identifier. In another example, the application requests the STA 302 to formulate the transport connection identifier. In this example, the transport connection identifier identifies that the MPTCP subflow should flow over the multipath link established by signals 310. In another example, the MPTCP subflow addition may include a request to create a new multipath link to be used for the MPTCP subflow.

In signal 316, the STA 302 sends a join signal, such as a SYN message with a MP_JOIN message, to the AP 304. The MPTCP subflow path may be established, and the STA 302 may send data from the MPTCP subflow to the peer 306 in signals 318.

Figure 4:
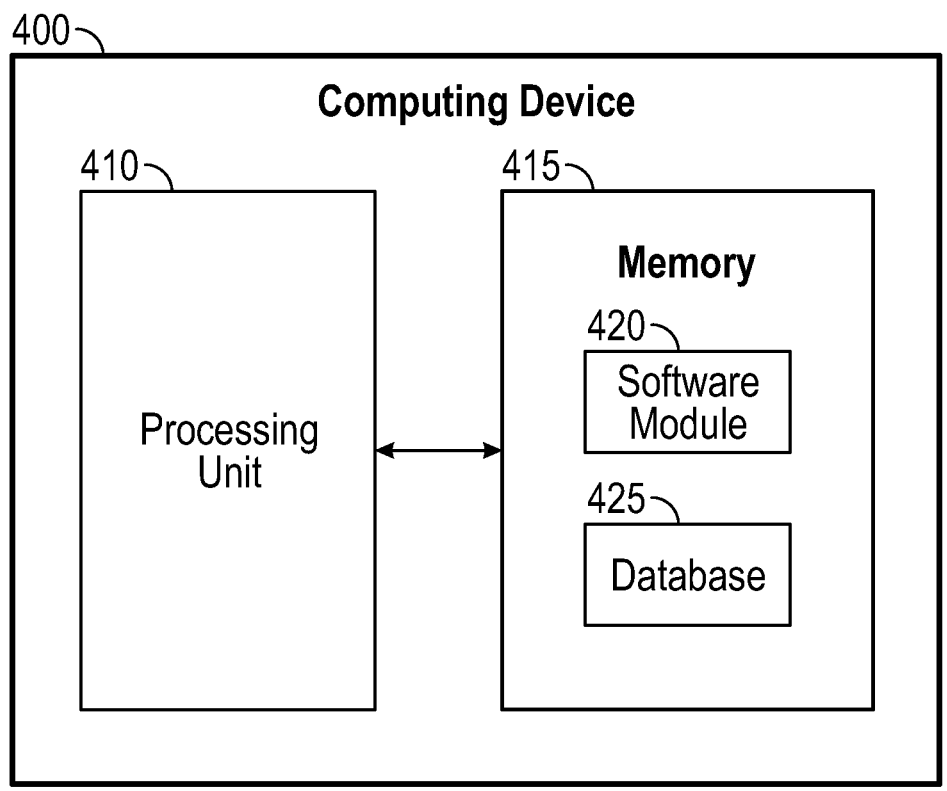
FIG. 4 is a block diagram of a computing device.

FIG. 4 is a block diagram of a computing device. As shown in FIG. 4, computing device 400 may include a processing unit 410 and a memory unit 415. Memory unit 415 may include a software module 420 and a database 425. While executing on processing unit 410, software module 420 may perform, for example, processes for supporting Multipath Transmission Control Protocol using Wi-Fi Multi-Link Operation as described above with respect to FIG. 1, FIG. 2, and FIG. 3. Computing device 400, for example, may provide an operating environment for the STA 102, the AP 104, the peer 106, and/or any other system described herein. The STA 102, the AP 104, the peer 106, and/or any other system described herein may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   establishing a multipath link between an Access Point (AP) and a station (STA);
   marking, by the STA, the multipath link as Multipath Transmission Control Protocol (MPTCP) capable;
   receiving a first request for an addition of a MPTCP subflow;
   in response to receiving the first request:
      binding the MPTCP subflow to the multipath link, and
      sending first data from the MPTCP subflow over the multipath link receiving a second request for a new addition of a second MPTCP subflow; and
   in response to receiving the second request:
      establishing a second multipath link between the AP and the STA,
      binding the second MPTCP subflow to the second multipath link, and
      sending second data from the MPTCP subflow over the second multipath link.

2. The method of claim 1, wherein the AP provides access to a Wi-Fi 7 network.

3. The method of claim 1, wherein the AP provides access to a cellular network with multi-link support.

4. The method of claim 1, further comprising sending a join signal over the multipath link, wherein the request for the addition of the MPTCP subflow comprises a join request to send the join signal over the multipath link.

5. The method of claim 1, further comprising binding the MPTCP subflow to the multipath link based on a transport connection identifier identifying the multipath link.

6. The method of claim 1, further comprising sending, by the STA to the AP, a notification that the second multipath link is for the exclusive use of the second MPTCP subflow.

7. The method of claim 1, further comprising:
   receiving a third request for deletion of the second MPTCP subflow; and
   deactivating, in response to receiving the second request, the second multipath link between the AP and the STA.

8. The method of claim 1, further comprising presenting each of the first multipath link and the second multipath link as a distinct IP interface to an upper level stack.

9. A system comprising:
   a memory storage; and
   a processing unit coupled to the memory storage, wherein the processing unit is operative to:
      establish a first multipath link to an Access Point (AP);
      mark the first multipath link as Multipath Transmission Control Protocol (MPTCP) capable;
      receive a first request for an addition of a MPTCP subflow;
      in response to receiving the first request:
         bind the MPTCP subflow to the first multipath link, and
         send first data from the MPTCP subflow over the first multipath link;
      receive a second request for a new addition of a second MPTCP subflow; and
      in response to receiving the second request:
         establish a second multipath link between the AP and the STA,
         bind the second MPTCP subflow to the second multipath link, and
         send second data from the MPTCP subflow over the second multipath link.

10. The system of claim 9, wherein the AP provides access to a Wi-Fi 7 network.

11. The system of claim 9, wherein the AP provides access to a cellular network with multi-link support.

12. The system of claim 9, wherein the processing unit is further operative to, send a join signal over the first multipath link, wherein the request for the addition of the MPTCP subflow comprises a join request to send the join signal over the first multipath link.

13. The system of claim 9, wherein the processing unit is further operative to, bind the MPTCP subflow to the first multipath link based on a transport connection identifier identifying the first multipath link.

14. The system of claim 9, wherein the processing unit is further operative to send to the AP a notification that the second multipath link is for the exclusive use of the second MPTCP subflow.

15. A non-transitory computer-readable medium that stores a set of instructions which when executed perform a method executed by the set of instructions comprising:
   establishing a first multipath link between an Access Point (AP) and a station (STA);

marking, by the STA, the first multipath link as Multipath Transmission Control Protocol (MPTCP) capable;
receiving a first request for an addition of a MPTCP subflow; and
in response to receiving the first request:
binding the MPTCP subflow to the first multipath link, and
sending first data from the MPTCP subflow over the first multipath linki receiving a second request for a new addition of a second MPTCP subflow; and
in response to receiving the second request:
establishing a second multipath link between the AP and the STA,
binding the second MPTCP subflow to the second multipath link, and
sending second data from the MPTCP subflow over the second multipath link.

16. The non-transitory computer-readable medium of claim 15, wherein the AP provides access to a Wi-Fi 7 network.

17. The non-transitory computer-readable medium of claim 15, wherein the AP provides access to a cellular network with multi-link support.

18. The non-transitory computer-readable medium of claim 15, further comprising sending a join signal over the first multipath link, wherein the request for the addition of the MPTCP subflow comprises a join request to send the join signal over the first multipath link.

19. The non-transitory computer-readable medium of claim 15, further comprising binding the MPTCP subflow to the first multipath link based on a transport connection identifier identifying the first multipath link.

20. The non-transitory computer-readable medium of claim 15, further comprising sending, by the STA to the AP, a notification that the second multipath link is for the exclusive use of the second MPTCP subflow.

* * * * *